Oct. 2, 1934.　　　H. M. PRYALE　　　1,975,405
SADDLE SEAT
Filed May 22, 1933
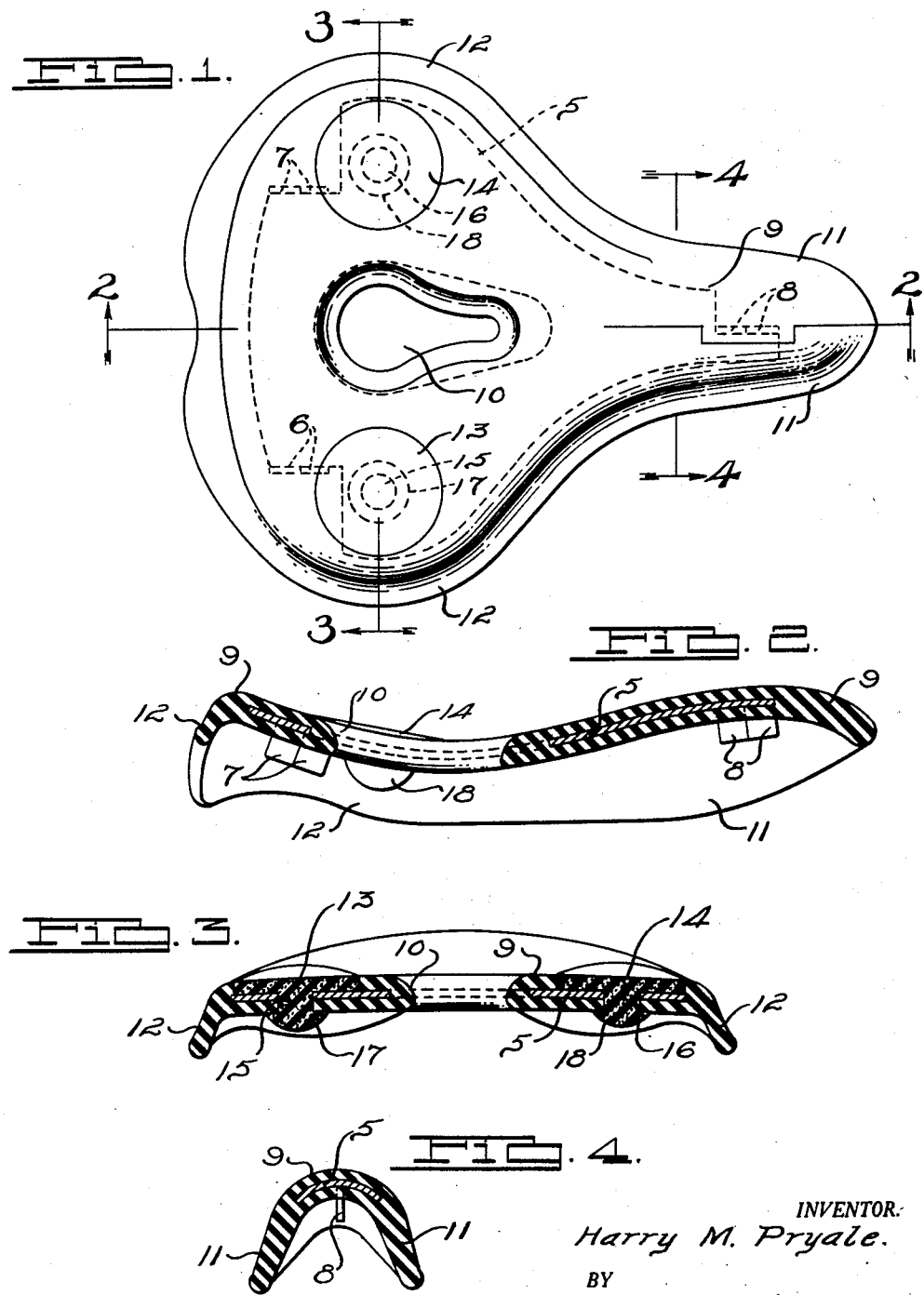
INVENTOR.
Harry M. Pryale.
BY
Harness, Dickey, Pierce & Hann.
ATTORNEYS.

Patented Oct. 2, 1934

1,975,405

UNITED STATES PATENT OFFICE 1,975,405

SADDLE SEAT

Harry M. Pryale, Pontiac, Mich., assignor to Baldwin Rubber Company, a corporation of Michigan Application May 22, 1933, Serial No. 672,090

4 Claims. (Cl. 208—15)

This invention relates to an improvement in seats or saddles for use on bicycles, tricycles, velocipedes and the like.

The main objects of this invention are to provide an improved seat or saddle of simple, economical construction; to provide a seat or saddle which can be produced at extremely low cost in quantity production; to provide improved means for attaching the seat to the bicycle or the like and to provide an improved construction of seat bearing surface which will materially contribute to the comfort of the user.

An illustrative embodiment of this invention is shown in the accompanying drawing in which:

Fig. 1 is a top plan view of the improved seat or saddle, the sheet metal reinforcing plate thereof being shown in dotted outline;

Fig. 2 is a sectional view taken on the line 2—2 of Fig. 1;

Fig. 3 is a sectional view taken on the line 3—3 of Fig. 1; and

Fig. 4 is a sectional view taken on the line 4—4 of Fig. 1.

In the construction shown in the drawing, a pressed sheet metal reinforcing plate 5 is stamped out by suitable dies or the like to the substantial shape shown in dotted outline in Fig. 1; the plate being slightly bent or reversely curved as shown most plainly in Fig. 2 of the drawing, so as to conform to the usual and customary shape of seats or saddles as employed on bicycles and like vehicles.

At points spaced laterally of the medial center line of the seat, the rear end of the sheet metal plate 5 has two pairs of tabs or lugs 6 and 7 slit from the body thereof and bent downwardly at right angles to the general plane of the reinforcing plate 5 to provide means for attaching the seat or saddle to a supporting structure. A similar pair of struck-out lugs or tabs 8 is provided at the front or pommel end of the seat for the same purpose.

The sheet metal supporting plate 5 is completely embedded in or surrounded by molded or vulcanized rubber 9, which is shaped to conform to the usual or customary contour of bicycle seats, an opening 10 being provided in the middle thereof and the front or pommel end curved downwardly at opposite sides as shown at 11 in Fig. 4, thus forming a side bearing wall to the seat in the general shape of a flange. This depending or downwardly and outwardly extending flange extends around the rest of the saddle as shown at 12 in Figs. 2 and 3, although at the other portions of the saddle it is of materially less extent than at the sides of the pommel end.

The thickness of the surrounding molded rubber is such that the attaching lugs 6, 7 and 8 protrude from the surface of the molded rubber a sufficient distance to be utilized for attaching the seat or saddle to a supporting structure as hereinafter described.

At each side of the saddle, toward the rear or cantle end thereof, discs 13 and 14 of relatively softer material, such as sponge rubber, are provided with the top surface thereof substantially flush with the molded material 9.

The discs 13 and 14 are preferably provided with concentrically positioned studs or shanks 15 and 16 respectively, which extend through apertures formed in the sheet metal plate 5 and in the surrounding vulcanized rubber 9. The ends of the shanks 15 and 16, opposite to the discs 13 and 14, are provided with laterally extending heads 17 and 18 respectively for engaging the underside of the seat for retaining the discs 13 and 14 in position.

In the manufacture of this improved seat or saddle, the sheet metal reinforcing plate 5 is first formed by blanking and forming dies following the customary practice employed in sheet metal work. The attaching lugs or tabs 6, 7 and 8 are, at the same time, slit and bent transversely to the general plane of the seat.

The reinforcing plate 5 is then placed in a suitable mold and the rubber 9 or other vulcanizable or hardening material is molded therearound, with the exception of the areas intended for the sponge rubber discs 13 and 14. The sponge rubber material forming the discs 13 and 14, with their integral shanks and heads are then placed or pressed into position, at which time the entire seat or saddle is subjected to the usual vulcanizing process employing heat and pressure.

It will be understood, however, that the use of the sponge rubber discs 13 and 14 is merely optional and may or may not be employed in the manufacture of this seat, according to the desires of the purchaser.

When attaching this seat or saddle to a supporting structure, it is intended that the downwardly extending lugs or tabs 6, 7 and 8 be passed through slots in the supporting structure and one of the tabs of each pair is bent transversely or horizontally in one direction, and the companion tab likewise bent, in the opposite direction.

Although but one specific embodiment of this invention has been herein shown and described, it will be understood that numerous details of the construction shown may be altered or omitted without departing from the spirit of this invention as defined by the following claims.

I claim:

1. A seat of the class described comprising a body of moulded rubber, a sheet metal reinforcing plate embedded in the moulded rubber and stamped out tabs on said metal plate which protrude from the surface of the surrounding rubber for attachment purposes.

2. A seat of the class described comprising a body of moulded rubber, a sheet metal reinforcing plate embedded in the moulded rubber, attaching means on said metal plate which protrude from the surface of the surrounding rubber and discs of relatively softer material located at spaced points on said seat substantially flush with the top surface thereof.

3. A seat of the class described comprising a body of moulded rubber, a sheet metal reinforcing plate embedded in the moulded rubber and having an aperture, attaching means on said metal plate which protrude from the surface of the surrounding rubber and discs of relatively softer material located at spaced points on said seat substantially flush with the top surface thereof, each of said discs having a shank extending through an aperture formed in said plate, said disc shanks having heads engaging the underside of said seat.

4. A seat of the class described comprising a body of moulded rubber, a sheet metal reinforcing plate embedded in the moulded rubber, attaching means on said metal plate which protrude from the surface of the surrounding rubber, and discs of sponge rubber located at spaced points on said seat.

HARRY M. PRYALE.